The cover page of United States Patent 4,407,734 to Denton et al., issued Oct. 4, 1983.

United States Patent [19]

Denton et al.

[11] 4,407,734

[45] Oct. 4, 1983

[54] SPRAY DRIED VANADIA CATALYST AND METHOD OF PREPARING IT

[75] Inventors: Dean A. Denton, Baltimore; Raymond D. Feldwick, Timonium, both of Md.

[73] Assignee: W. R. Grace & Co., New York, N.Y.

[21] Appl. No.: 291,685

[22] Filed: Aug. 10, 1981

[51] Int. Cl.$^3$ .................. B01J 21/04; B01J 21/08; B01J 21/12; B01J 23/22

[52] U.S. Cl. .................. 502/9; 502/263; 502/247; 502/302; 502/80; 502/354

[58] Field of Search .............. 252/456, 461, 464, 462, 252/448, 455 R; 260/465 C

[56] References Cited

U.S. PATENT DOCUMENTS

| | | | |
|---|---|---|---|
| 3,544,617 | 12/1970 | Oga et al. | 252/461 X |
| 3,637,797 | 1/1972 | Decker et al. | 260/465 C |
| 3,686,138 | 8/1972 | Yoshino et al. | 252/456 |
| 3,772,212 | 11/1973 | Saito et al. | 260/465 C |
| 3,870,743 | 3/1975 | Ibing et al. | 260/465 C |
| 3,959,339 | 5/1976 | Saito et al. | 260/465 C |
| 4,051,140 | 9/1977 | Gelbein et al. | 260/290 P |
| 4,077,912 | 3/1978 | Dolhyj et al. | 252/461 |
| 4,092,271 | 5/1978 | Sze | 252/455 R |
| 4,142,994 | 3/1979 | Alafandi | 252/450 |
| 4,284,530 | 8/1981 | Sherif | 252/455 |
| 4,312,787 | 1/1982 | Dolhyj et al. | 252/435 |

FOREIGN PATENT DOCUMENTS

| | | | |
|---|---|---|---|
| 42-13717 | 3/1967 | Japan | 252/464 |
| 1285075 | 8/1972 | United Kingdom . | |
| 1331548 | 9/1973 | United Kingdom . | |
| 1351523 | 5/1974 | United Kingdom . | |
| 1424486 | 2/1976 | United Kingdom . | |

*Primary Examiner*—W. J. Shine
*Attorney, Agent, or Firm*—Mark T. Collins

[57] ABSTRACT

A catalyst that is especially useful in the production of aromatic nitriles by a fluidized bed process comprises highly attrition-resistant microspherical particles of vanadia and an inert support and is prepared by spray drying an aqueous slurry of finely divided particles of vanadia and the support.

20 Claims, No Drawings

SPRAY DRIED VANADIA CATALYST AND METHOD OF PREPARING IT

This invention relates to supported vanadia catalysts and more particularly to microspherical catalyst particles containing vanadia and an inert support.

Supported vanadia and other supported polyvalent metal oxides are well-known catalysts for a wide variety of fluidized bed processes. A relatively catalytically inert support of low porosity and surface area or a catalytically active support of much higher porosity and surface area may be employed depending on the activity and selectivity required in the reaction in which the catalyst is to be used. In addition to high activity and selectivity, the catalysts must have high resistance to attrition to avoid fragmentation of the particles and the production of fines. Attrition can cause excessive pressure drops, reactant bypassing, and loss of catalyst from the reactor with the exiting product in fluidized bed processes.

Various methods have been proposed to increase the attrition resistance of supported catalyst particles in fluidized bed processes. U.S. Pat. No. 3,686,138 of Yoshino et al. describes the preparation of microspherical catalyst particles by spray drying a slurry of a pentavalent antimony compound, a polyvalent metal compound, and a silica sol. The pH of the slurry is adjusted to a value below 7 and the slurry is heated prior to spray drying to improve the attrition resistance of the catalyst in the fluidized bed oxidation and ammoxidation of olefins. A vanadium compound may be used as the polyvalent metal compound and can conveniently be such water-soluble compounds as ammonium metavanadate and vanadyl oxalate. In addition, a slightly water soluble polyvalent metal compound can be used as long as it can be finely divided in an aqueous medium. Aluminum and alkali metals such as sodium and potassium may also be present in the slurry. The silica sol is preferably used in an amount of from about 10 to 90 percent calculated as silica per 100 parts by weight of the final catalyst and may be combined with other carriers such as silica gel, diatomaceous earth, or other forms of silica and alumina materials in the form of sols, gels, or powders. The carrier materials in a form other than a sol are preferably finely divided. Vanadia-containing catalysts are described in Example 17 and Control 16.

The microspherical catalyst particles of the present invention comprise at least about 25 percent of vanadia and at least about 15 percent of an inert support. In accordance with the method of the present invention, an aqueous slurry of vanadia and an inert support is spray dried to form microspherical particles and the particles are calcined. The catalyst particles have high attrition resistance in the production of aromatic nitriles by a fluidized bed process.

The support employed in the present invention is a relatively catalytically inert material of low pore volume and surface area. The surface area of the support and of the catalyst is generally less than about 25 square meters per gram and preferably less than about 15 square meters per gram. The pore volume of the support and of the catalyst is generally less than about 0.1 cubic centimeter per gram and preferably less than about 0.05 cubic centimeter per gram. The surface areas and pore volumes referred to throughout this specification were determined by the nitrogen adsorption method described in Brunauer, Emmett, and Teller, 60 J.Am.Chem.Soc. 309 (1938). The method is run to $P/P_o$ of 0.967 so that pore diameters of from 14 to 600 angstroms are measured.

Suitable relatively catalytically inert supports include alumina, silica, and aluminosilicate materials of low surface area and pore volume such as alpha alumina, crystalline silica, and crystalline aluminosilicate clays. Aluminosilicate clays having an $Al_2O_3$ content of from about 40 to about 60 weight percent and an $SiO_2$ content of from about 40 to about 60 weight percent are especially effective in producing catalyst particles of superior attrition resistance.

The inert support material is finely divided and generally has a weight median particle diameter of less than about 5 microns and preferably of from about 0.1 to about 2 microns. The finely divided vanadia is vanadium pentoxide and has a weight median particle diameter of generally less than about 150 microns and preferably of from about 2 to about 125 microns. The vanadia and inert support are slurried in the proportions desired in the final catalyst. The vanadia comprises at least about 25 weight percent, preferably at least about 30 weight percent, and especially at least about 40 weight percent of the catalyst. The inert support comprises at least about 15 weight percent, preferably at least about 40 weight percent, and especially at least about 50 weight percent of the catalyst. The weight ratio of the vanadium pentoxide to the inert support generally ranges from about 0.3:1 to about 3:1 and preferably is from about 0.4:1 to about 1.5:1.

A promoter may also be added to the slurry to enhance the selectivity of the vanadia in the final catalyst. Typically, a promoter such as alkali metal oxide or cerium oxide may be incorporated in the catalyst by adding an alkali metal hydroxide or a water soluble alkali metal or cerium salt such as sodium carbonate or cerous nitrate to the slurry in an amount sufficient to provide a vanadium metal to promoter metal mole ratio of from about 2 to 1 to about 30 to 1 and preferably of from about 8:1 to about 20:1. An alkali metal hydroxide is preferably added to the slurry in an amount sufficient to provide a slurry pH of greater than about 10. The alkali metal is either lithium, sodium, potassium, rubidium or cesium and preferably is sodium. Alternatively, an aqueous solution of a water soluble compound of the promoter metal may be impregnated on the supported vanadia catalyst particles and the impregnated particles calcined to convert the salt to the oxide.

A water soluble silicate salt such as sodium silicate, water soluble aluminum salt such as aluminum nitrate, silica sol, or alumina sol may be included in the slurry if the presence of amorphous silica or alumina is desired in the reaction in which the catalyst is used. The sol or solution is generally added to the slurry in an amount sufficient to provide from about 1 to 45 weight percent of amorphous silica or alumina in the final catalyst.

In carrying out the catalyst preparation method of this invention, the finely divided vanadia and inert support are slurried in water. The solids content in the slurry is selected to avoid excessive viscosity and difficulty in spray drying and generally ranges from about 10 to about 40 percent based on the total weight of the slurry. The components of the slurry may be mixed together in any order but generally the finely divided vanadia, any promoter, any binder, and the inert support are added to water in the stated order and agitated for a period sufficient to provide a uniform mixture.

The slurry is spray dried to form microspherical catalyst particles. Any conventional spray dryer, such as a pressurized nozzle or rotary disc or vane spray dryer, may be used. The drying gas may be heated air with an outlet air temperature of from about 100° to about 200° C. and an inlet air temperature of from about 250° to 350° C.

After spray drying, the catalyst particles are calcined at a temperature of from about 650° C. to about 1000° C. for a period of from about 15 minutes to about 1 hour. A calciner which provides agitation of the catalyst, such as a rotary calciner, is preferred in order to avoid adhesion and provide uniform heating of the particles.

The microspherical catalyst particles of the present invention have a substantially spherical shape and a weight median particle diameter of generally from about 5 to about 100 microns and preferably of from about 60 to about 90 microns. The catalyst may be employed in a wide variety of chemical reactions and is particularly suitable for the production of aromatic nitriles by reaction of a gaseous mixture of ammonia, molecular oxygen, and an alkyl substituted aromatic hydrocarbon.

The invention is further illustrated by the following examples in which all percentages are by weight. In the examples, the vanadium pentoxide had a weight median particle diameter of 106 microns and the catalyst particles had a weight median particle diameter of about 80 microns due to disintegration of the vanadia during mixing of the slurry. The aluminosilicate clay had the particle size distribution and composition shown in Table I.

TABLE I

| Properties of Aluminosilicate Clay | |
|---|---|
| Particle Size Distribution | 82% less than 2 Microns in Diameter |
| Loss on Ignition at 950° C. | 14.5 |
| % $SiO_2$ | 52.7 |
| % $Al_2O_3$ | 46.1 |
| % $Na_2O$ | 0.03 |
| % $K_2O$ | 0.24 |
| % $Fe_2O_3$ | 1.13 |
| % $TiO_2$ | 2.54 |
| % Cu | Trace |
| % Mg | 0.03–0.1 |
| % V | 0.01–0.03 |
| % Fr | 0.03–0.1 |
| % Mn | 0.01–0.03 |
| % Cr | Trace |
| % Cu | Trace |

EXAMPLE 1

6800 grams of vanadium pentoxide, 900 grams of a 50 weight percent sodium hydroxide solution, and 8600 grams of clay were added in the stated order to 30 pounds of water and blended for about 5 minutes. The resulting slurry was fed into a rotary spray dryer with the vane wheel rotating at 11,000 revolutions per minute. Air was introduced at an inlet temperature of 315° C. and had an outlet temperature of 148° C. The microspherical particles produced by spray drying were heated at 734° C. for 45 minutes in a rotary calciner.

EXAMPLE 2

6800 grams of vanadium pentoxide, 600 grams of a 50 weight percent aqueous sodium hydroxide solution, and 10,800 grams of clay were added in the stated order to 35 pounds of water and blended for about 5 minutes. The slurry was spray dried and the microspherical particles were calcined in accordance with the procedure of Example 1.

EXAMPLE 3

6800 grams of vanadium pentoxide, 600 grams of a 50 weight percent aqueous sodium hydroxide solution, 7900 grams of silica sol containing 40 weight percent $SiO_2$, and 7400 grams of clay were added in the stated order to 30 pounds of water and blended for about 5 minutes. The slurry was spray dried and the microspherical particles were calcined in accordance with the procedure of Example 1.

EXAMPLE 4

6800 grams of vanadium pentoxide, 400 grams of sodium carbonate, 3771 grams of aluminum nitrate, and 10,600 grams of clay were added in the stated order to 30 pounds of water and blended for about 5 minutes. The slurry was spray dried and the microspherical particles were calcined in accordance with the procedure of Example 1.

The properties of the catalysts of Examples 1 to 4 are shown in Table II.

TABLE II

| | Catalyst Properties | | | |
|---|---|---|---|---|
| Example No. | 1 | 2 | 3 | 4 |
| % $V_2O_5$ | 47.27 | 37.11 | 42.14 | 46.40 |
| % $Na_2O$ | 2.19 | 1.18 | 1.25 | 1.10 |
| % Amorphous $SiO_2$ | — | — | 19 | — |
| % Amorphous $Al_2O_3$ | — | — | — | 3 |
| Surface Area ($m^2/g$) | 2 | 11 | 11 | 8 |
| Pore Volume ($cm^3/g$) | 0 | 0.01 | 0.01 | 0.02 |

What is claimed is:

1. A catalyst comprising microspherical particles having a weight median particle diameter of from about 5 to about 100 microns and containing in a uniform mixture at least about 25 weight percent of vanadia and at least about 15 weight percent of an aluminosilicate clay inert support having a surface area of less than about 25 square meters per gram.

2. The catalyst of claim 1 in which the inert support has a pore volume of less than about 0.1 cubic centimeter per gram.

3. The catalyst of claim 1 in which the inert support has a surface area of less than about 15 square meters per gram and a pore volume of less than about 0.05 cubic centimeter per gram.

4. The catalyst of claim 1 in which the aluminosilicate clay has an $Al_2O_3$ content of from about 40 to about 60 weight percent and an $SiO_2$ content of about 40 to about 60 weight percent.

5. The catalyst of claim 1 containing at least about 30 weight percent vanadia and at least about 40 weight percent of the inert support.

6. The catalyst of claim 1 containing at least about 40 weight percent vanadia and at least about 50 weight percent of the inert support.

7. The catalyst of claim 1 in which the microspherical particles further contain from about 1 to about 45 weight percent of amorphous silica or alumina.

8. The catalyst of claim 1 in which the microspherical particles also contain an alkali metal oxide or cerium oxide promoter.

9. A catalyst comprising microspherical particles having a weight median particle diameter of from about 5 to about 100 microns and containing at least about 40 weight percent vanadia, at least about 50 weight percent of an aluminosilicate clay support having a surface area of less than about 25 square meters per gram, and an alkali metal oxide, said particles having a vanadia to alkali metal weight ratio of from about 8:1 to about 20:1.

10. A method of preparing a supported microspherical vanadia catalyst comprising spray drying an aqueous slurry of finely divided vanadia and a finely divided alpha alumina, crystalline silica, or aluminosilicate clay inert support having a surface area of less than about 25 square meters per gram in amounts sufficient to form microspherical particles consisting essentially of at least about 25 weight percent vanadia and at least about 15 weight percent of the inert support and calcining the microspherical particles to provide a catalyst having a weight median particle diameter of from about 5 to about 100 microns.

11. The method of claim 10 in which the inert support has a pore volume of less than about 0.1 cubic centimeter per gram.

12. The method of claim 10 in which the inert support has a surface area of less than about 15 square meters per gram and a pore volume of less than about 0.05 cubic centimeter per gram.

13. The method of claim 10, 11, or 12 in which the inert support comprises an aluminosilicate clay.

14. The method of claim 13 in which the aluminosilicate clay has an $Al_2O_3$ content of from about 40 to about 60 weight percent and an $SiO_2$ content of from about 40 to about 60 weight percent.

15. The method of claim 10 in which the vanadia and inert support are present in the slurry in amounts sufficient to provide microspherical particles containing at least about 30 weight percent vanadia and at least about 40 weight percent of the inert support.

16. The method of claim 10 in which the vanadia and the inert support are present in the slurry in amounts sufficient to provide microspherical particles containing at least about 40 weight percent vanadia and at least about 50 weight percent of the inert support.

17. The method of claim 10 in which the slurry also contains an alkali metal hydroxide in an amount sufficient to provide a slurry pH of greater than about 10.

18. The method of claim 10 in which the slurry also contains a sodium silicate solution, silica sol, aluminum nitrate solution, or alumina sol in amounts sufficient to provide from about 1 to about 45 weight percent amorphous silica or amorphous alumina in the microspherical particles.

19. The method of claim 10, 11, or 12 in which the inert support comprises alpha alumina or an aluminosilicate clay.

20. The catalyst of claim 1 in which the microspherical particles consist essentially of the vanadia and the inert support.

* * * * *